United States Patent [19]

Mako et al.

[11] Patent Number: 5,599,468
[45] Date of Patent: Feb. 4, 1997

[54] PULSED ELECTRON BEAM JOINING OF MATERIALS

[75] Inventors: Frederick M. Mako, 6308 Youngs Branch Dr., Fairfax Station, Va. 22039; Richard Silberglitt, Fairfax, Va.; Lek K. Len, Bowie, Md.

[73] Assignees: Frederick M. Mako, Fairfax Station, Va.; Ansel M. Schwartz, Pittsburgh, Pa.

[21] Appl. No.: 317,241

[22] Filed: Oct. 3, 1994

[51] Int. Cl.$^6$ .................................................. B23K 15/00
[52] U.S. Cl. ............................................................ 219/121.14
[58] Field of Search ..................... 219/121.13, 121.14, 219/121.35; 148/524, 525, 565; 156/272.2

[56] References Cited

U.S. PATENT DOCUMENTS

| | | | |
|---|---|---|---|
| 4,263,496 | 4/1981 | Medlar | 219/121.14 |
| 4,492,846 | 1/1985 | Hara et al. | 219/121.13 |
| 4,503,314 | 3/1985 | Kakimi et al. | 219/121.14 |
| 4,890,783 | 1/1990 | Li | 148/524 |

FOREIGN PATENT DOCUMENTS

| | | | |
|---|---|---|---|
| 50-28375 | 9/1975 | Japan | 219/121.14 |
| 55-100888 | 8/1980 | Japan | 219/121.14 |

*Primary Examiner*—Teresa J. Walberg
*Assistant Examiner*—Gregory L. Mills
*Attorney, Agent, or Firm*—Ansel M. Schwartz

[57] ABSTRACT

The present invention is a method of joining two materials by single pulse electron radiation. The method comprises the step of disposing a first material layer adjacent to a second material layer such that an interface is disposed therebetween. Then there is the step of irradiating the interface with a pulsed electron beam such that energy of the pulsed electron beam is selectively deposited in a narrow spatial region and localized at the interface to produce an effective joint between the first and second material layers in a single pulse. Preferably, before the irradiating step, there is the step of calculating an optimum temperature profile across the interface depending on electron energy, beam current density and pulse length of the pulsed electron beam. The electron energy of the pulsed electron beam is preferably in the range of 100 keV to 10 MeV. The pulsed electron beam current density is preferably in the range of 1–1000 A/cm$^2$. The pulsed electron beam pulse length is preferably in the range of 100 nsec ($10^{-7}$ seconds) to 100 μsec ($10^{-4}$ seconds). If desired, there can be interlayer materials disposed between the first and second materials.

19 Claims, 8 Drawing Sheets

VOLTAGES CATHODE: −360 kV INTERMEDIATE: 180 kV ANODE: 0 kV

PULSED ELECTRON BEAM JOINING OF MATERIALS

FIELD OF THE INVENTION

The present invention is related in general to manufacturing. More specifically, the present invention is related to a method for joining materials using single pulse electron beam irradiation.

BACKGROUND OF THE INVENTION

Joining of advanced materials such as high temperature metals (e.g., nickel-based superalloys and intermetallics), ceramics, and composites based upon these materials is a challenging technological problem. (See, for example, "Joining and Adhesion of Advanced Inorganic Materials," A. Carim, D. Schwartz and R. Silberglitt, eds., MRS Symposium Proceedings Vol. 314, Materials Research Society, Pittsburgh, Pa. 1993.) For metals, maintaining the desired microstructure and preventing the formation of potentially brittle intermetallic phases are problems. The combination of high strength and low fracture toughness makes ceramics brittle materials, vulnerable to cracking induced by any residual stresses resulting from the joining process. Composites with either metallic or ceramic matrices, typically reinforced with ceramic fibers, whiskers or particles, have good fracture strength and flaw tolerance, but their thermal and mechanical properties are sufficiently different from those of the metals that they are intended to replace that discontinuities at the bonding layer, particularly in thermal expansion coefficient, lead to weak joints. (See, for example, R. D. Watkins in "Engineered Materials Handbook, Volume 4: Ceramics and Glasses," ASM International, Metals Park, Ohio, 1991, p. 478.)

Joining of dissimilar materials is generally difficult because of such discontinuities. Interlayer materials with graded properties (called functionally gradient materials) are sometimes employed to minimize stresses that can lead to joint failure. However, providing the energy needed to heat the interlayer material to joining temperature and holding it at that temperature for the necessary time can lead to degradation of the properties of the materials being joined.

Ceramic or ceramic matrix composite-metal joining is important because the ceramic and composite materials have the potential for increased service temperatures, leading to improved performance, in many aerospace and industrial applications (e.g., turbine combustors and rotors, industrial heat exchangers and chemical process systems). The introduction of the ceramics in the high temperature components or sections of systems will require joining them to metallic components. The simplest way to accomplish this is a mechanical interlock. However, mechanical interlocking requires extensive machining of the ceramic component, which is often very expensive. In addition, wear and friction at the mechanically joined interface, caused by high speed motions and thermal cycling stress during service, may lead to reduction of bond strength and fatigue flaws. Another approach is to heat the interface to high temperature while maintaining good contact, to allow interdiffusion of the materials. While this is a popular technique for joining advanced metals, high temperatures and long times are necessary for strong diffusion bonding of ceramics because of the extremely low diffusivities of most atoms and ions in ceramics at the relevant temperatures.

The most commonly used method for joining metals and ceramics is brazing. Good braze joints have been obtained through the application of a refractory metal paste (e.g., Mo or W) on a ceramic surface, followed by sintering to form a metallized glassy layer on the ceramic. Metals can then be readily brazed to the metallized ceramic. (See, for example, V. A. Greenhut, "Progress in Ceramic Metal Joining and Metallization," Proceedings of TMS Fall Meeting, The Metallurgical, Minerals and Materials Society, Cleveland, Ohio, 1990, p. 103 and J. Intrater, "The Challenge of Bonding Metals to Ceramics," *Machine Design*, Nov., 1989). Alternatively,brazing can be accomplished in one step by introducing active metals such as Ti, Al, Zr and Hf into brazing alloy compositions. (See, for example, M. Santella, "A Review of Technology for Joining Advanced Ceramics," *Ceramic Bulletin*, vol. 71, No. 6, American Ceramic Society, Westerville, Ohio, 1992, p. 947.)

While brazing can provide strong metal-ceramic joints, the properties of these joints degrade rapidly at high temperature (e.g., T>1000° C.). For example, active metals have poor oxidation resistance at elevated temperatures. They may continue to react with the mating materials during service at elevated temperature, leading to the formation of intermetallic layers. The embrittlement of the intermetallic phase will then dramatically reduce the bond strength. Glassy phases can also impair strength, toughness and thermal properties of the final assembly under high temperature service conditions.

SUMMARY OF THE INVENTION

The present invention is a method of joining two materials by single pulse electron radiation. The method comprises the step of disposing a first material layer adjacent to a second material layer such that an interface is disposed therebetween. Then there is the step of irradiating the interface with a single pulse electron beam such that energy of the electron beam is selectively deposited in a narrow spatial region and localized at the interface to produce an effective joint between the first and second material layers in a single pulse. Preferably, before the irradiating step, there is the step of calculating an optimum temperature profile across the interface depending on electron energy, beam current density and pulse length of the pulsed electron beam. The pulsed electron beam pulse length is preferably in the range of 100 nsec ($10^7$ seconds) to 100 μsec ($10^4$ seconds). The electron energy of the pulsed electron beam is preferably in the range of 100 keV to 10 MeV. The pulsed electron beam current density is preferably in the range of 1–1000 A/cm$^2$. If desired,there can be interlayer materials disposed between the first and second materials.

BRIEF DESCRIPTION OF THE DRAWINGS

In the accompanying drawings, the preferred embodiment of the invention and preferred methods of practicing the invention are illustrated in which.

DESCRIPTION OF THE PREFERRED EMBODIMENT

Figure 1:
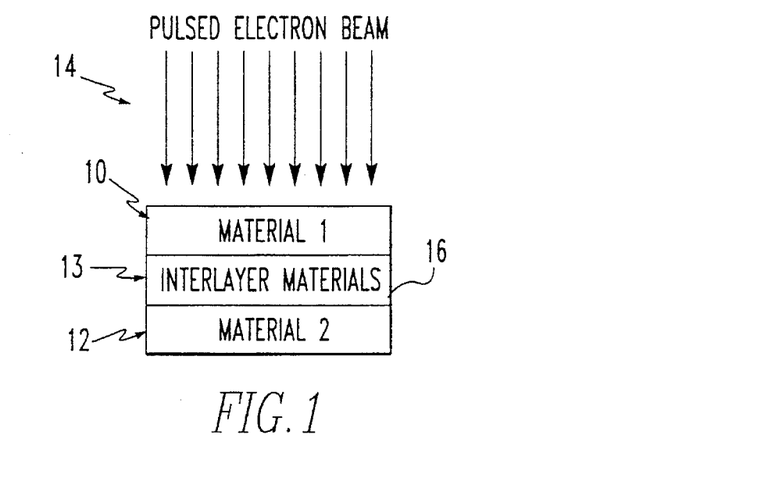
FIG. 1 is a schematic representation showing the single pulse irradiation joining method of the present invention.

Referring now to the drawings wherein like reference numerals refer to similar or identical parts throughout the several views, and more specifically to FIG. 1 thereof, there is shown a method of joining two materials by single pulse electron radiation. The method comprises the step of disposing a first material layer 10 adjacent to a second material layer 12 such that an interface 13 is disposed therebetween. Then there is the step of irradiating the interface 13 with a pulsed electron beam 14 such that energy of the pulsed electron beam 14 is selectively deposited in a narrow spatial region and localized at the interface to produce an effective joint between the first and second material layers 10, 12 in a single pulse. Preferably, before the irradiating step, there is the step of calculating an optimum temperature profile across the interface 13 depending on electron energy, beam current density and pulse length of the pulsed electron beam. The pulsed electron beam pulse length is preferably in the range of 100 nsec ($10^{-7}$ seconds) to 100 μsec ($10^{-4}$ seconds). The electron energy of the pulsed electron beam is preferably in the range of 100 keV to 10 MeV. The pulsed electron beam current density is preferably in the range of 1–1000 A/cm$^2$. If desired, there can be interlayer materials 16 disposed between the first and second materials 10, 12.

This method uses irradiation of the materials to be joined by a pulsed electron beam (PEB) to increase the temperature of the joint region to the required value. The primary mechanism of PEB energy deposition is inelastic scattering of electrons in the irradiated material, followed by conversion to heat. The energy deposition increases as the density of the irradiated material increases. The range, or penetration distance into the material, varies inversely with the material density and increases with electron energy. Thus by judicious choice of the electron energy, density, and thickness of the materials to be joined (including any interlayer materials), the electron beam energy can be selectively deposited in a narrow spatial region at the interlayer. This energy is then rapidly converted to heat, raising the temperature of the irradiated material. The temperature profile in the material depends upon a combination of electron beam and materials parameters, principally the current density, pulse length, and thermal properties of the irradiated material such as the specific heat and the thermal skin depth. The methods of the present invention entail calculation of an appropriate range of these parameters that results in a temperature profile that can be used to join similar or dissimilar materials without destructively heating them.

The use of the PEB method provides many advantages as compared to joining techniques that use conventional heating, especially for dissimilar joints such as ceramic-metal, metal-polymer, or ceramic-polymer. For example, a fundamental problem in conventional joining of ceramics-metals is the restriction to very low joining temperature because of the low service temperature of metal components. This typically requires long joining time, high applied pressure and the limitation of using low melting point brazing alloys. (See, for example, K. Suganuma, "Recent Advances in Joining Technology of Ceramics to Metals," *ISIJ International*, vol. 30, No. 12, 1990, p. 1046.) The PEB method avoids all of these problems by rapidly (e.g., $10^{-6}$ seconds) and selectively depositing the energy at the interlayer 16 to effect a joint without heating the bulk of the material to high temperatures. In addition, the electron beam can penetrate insulating or conducting materials and deposit energy at a buried interlayer 16, in contrast to electromagnetic field heating methods such as radio frequency (RF) and microwaves, which are limited by the electromagnetic skin depth of the material. (See, for example, "Microwave Processing of Materials I, II, and III," MRS Symposium Proceedings Vols. 124, 189 and 269, 1988, 1991, and 1993.)

The PEB method allows tailoring of the temperature profile across, for instance, a ceramic-metal interface in order to achieve sufficiently high temperatures for bonding at the interface, while avoiding temperatures in the metal component that will damage its microstructure. The control of temperature profiles also allows the selection of intermediate layer materials in order to: (1) produce a coefficient of thermal expansion (CTE) gradient across the interlayer 16 to minimize CTE mismatch; (2) eliminate the use of active filler metals; and (3) form a strong eutectic bond. In addition, the very short processing time with the single pulse PEB method not only improves throughput, but also suppresses undesirable chemical reactions such as oxidation and the formation of intermetallic phases. Finally, the equipment necessary for PEB joining generates a pulsed electron beam, which requires a much smaller average power supply than the continuous wave (CW) systems used with conventional electron beam (EB) welders. The preferential temperature profile produced in a PEB system is completely "washed away" by thermal diffusion in a conventional DC EB welder.

It should be appreciated that the current invention is fundamentally and substantially different from recent work that uses a High Energy Electron Beam (HEEB) for joining of ceramics and metals (e.g., Proceedings of the Conference and Workshop on High Energy Electron Beam Welding and Materials Processing, J. C. Danko and E. E. Nolting, eds., American Welding Society (AWS), Miami, Fla., 1993). First of all, most of the HEEB joining schemes use electron accelerators that were assembled for defense applications. Such accelerators typically produce electron beams with very short pulse lengths, (e.g., $1\times10^{-8}$ to $5\times10^{-8}$ seconds), which create a large enough pressure wave amplitude in the irradiated material to debond any joint that is formed. The current invention uses a pulse length in the range of 100 nsec ($10^{-7}$ seconds) to 100 μsec ($10^{-4}$ seconds). This range is chosen to allow a long enough heating time so that pressure wave effects will not impede bonding, while also keeping the heating time short enough that the heat will not leak out of the interlayer region. This type of single pulse PEB joining method has not been disclosed previously.

There have been two previous HEEB investigations that used accelerators with pulse lengths in the $10^{-6}$ second range (AWS, 1993, ibid, p. 123 and Materials Research Society (MRS) Symposium Proceedings, Microwave Processing of Materials IV, M. Iskander and R. Lauf, eds., 1994 (in press), paper 014.24). However, in both cases the electron beam current density was not in the appropriate range for single pulse joining for the materials under investigation. As demonstrated in the examples shown in the following section, there is a narrow range of electron beam parameters that will provide good bonding and that range of parameters depends upon the properties of the materials being joined. The work reported in the AWS HEEB proceedings used a 100 A/cm$^2$ current density, which was too large for the C—C composite sandwich they were seeking to bond with a metal interlayer 16. The result was that the electron beam vaporized the metal interlayer 16 rather than producing a bond. The work reported at the Apr., 1994 MRS meeting (proceedings referenced above) used a 600 mA/cm$^2$ current density, which was too small for the Si$_3$N$_4$ sandwich they were seeking to bond with a metal interlayer. In this case, the investigators used a multiple pulse approach in which they continued irradiation for several seconds, during which time thousands of pulses provided enough cumulative heating to bring the metal up to a high enough temperature to form a bond. This approach is dependent upon having the interlayer surrounded by an insulating material that will retain the heat from each pulse, as is the case for a ceramic-metal-ceramic joint. It cannot be used for a ceramic-metal joint, or any other joint in which the material on one side has high thermal conductivity. Conversely, the current invention, which uses a single pulse for joining, can be used for any type of similar or dissimilar joint. In fact, the ceramic-metal case is the first example described below.

The use of an electron accelerator capable of producing pulses at a repetition rate of hundreds or thousands of pulses per second is not essential to the current invention, which creates a joint with a single pulse. However, repetitive pulsing can be used in the current invention to provide a rapid scan rate across a joint interface and provide a high level of throughput in manufacturing operations.

Figure 2:
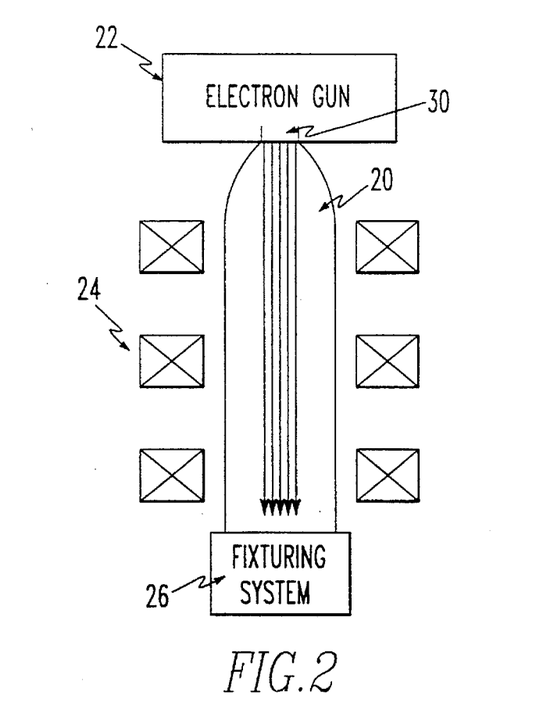
FIG. 2 is a schematic representation showing an apparatus for single pulse irradiation joining of materials.
Figure 3:
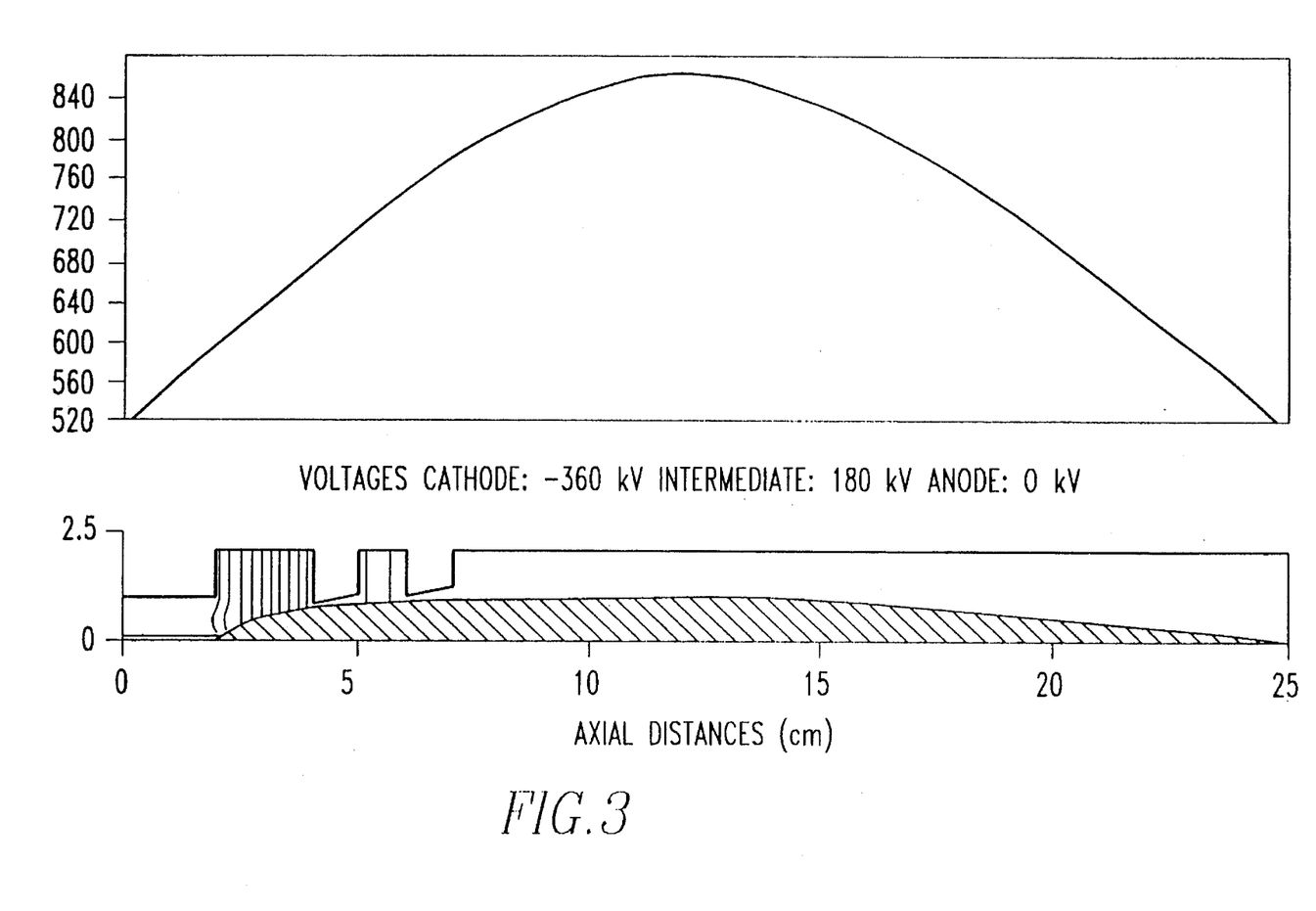
FIG. 3 is a schematic representation illustrating a preferred electron beam trajectory of a single pulse electron gun.
Figure 4:
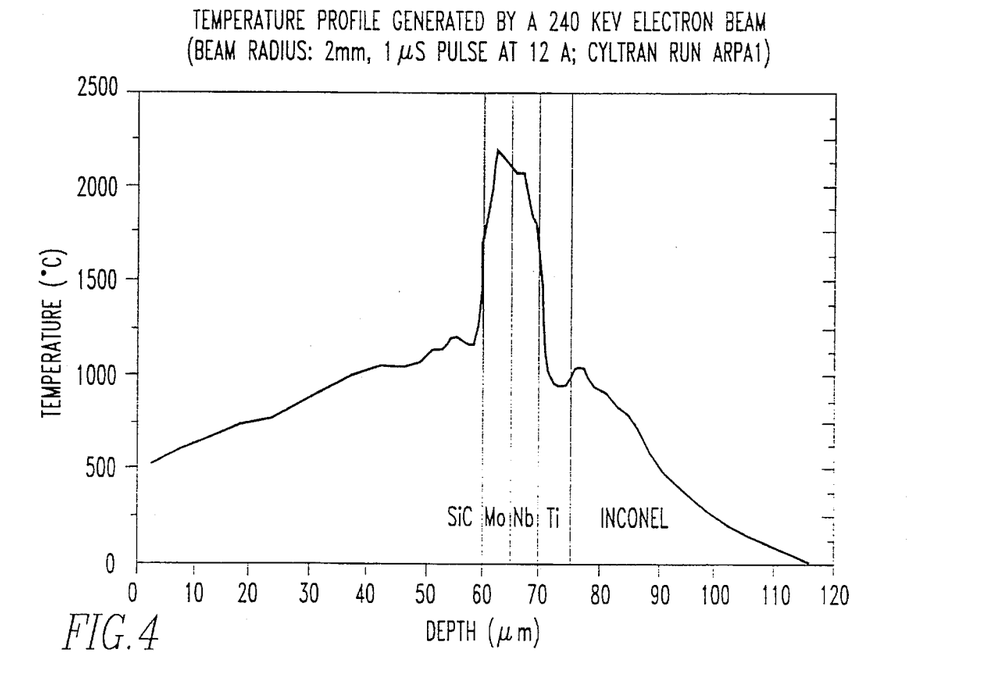
FIG. 4 is a graph showing a temperature profile for SiC/SiC-superalloy joining with a 240 keV electron beam.
Figure 5:
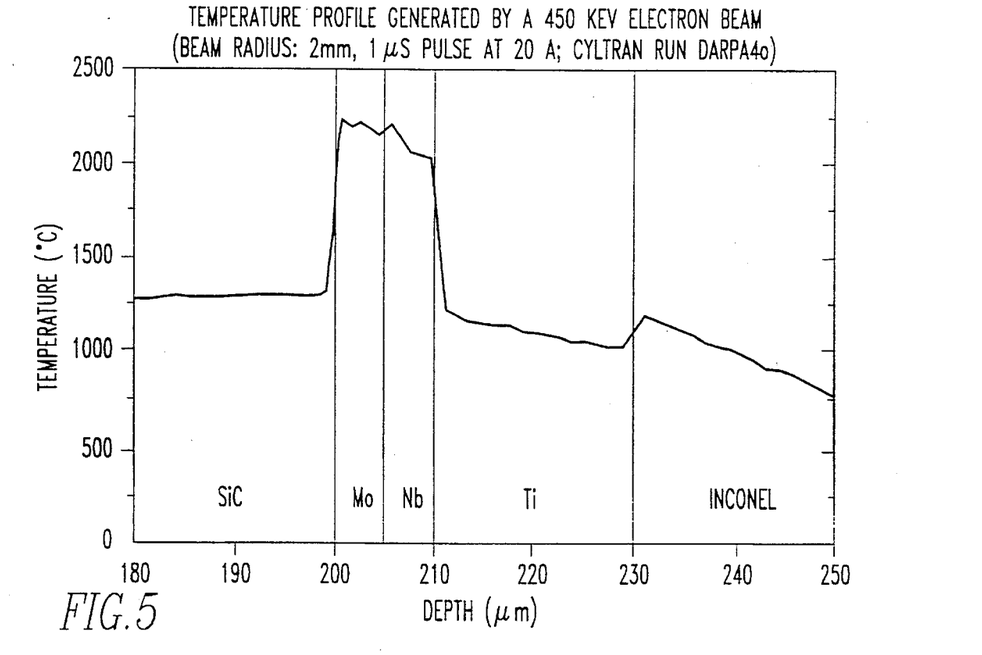
FIG. 5 is a graph showing a temperature profile for SiC/SiC-superalloy joining with a 450 keV electron beam.
Figure 6:
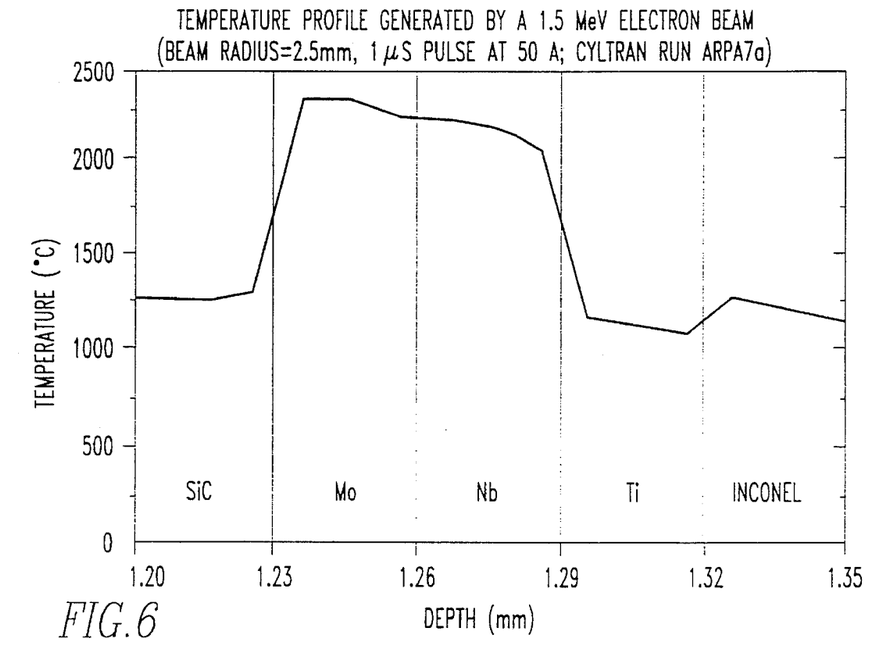
FIG. 6 is a graph showing a temperature profile for SiC/SiC-superalloy joining with a 1.5 MeV electron beam.
Figure 7:
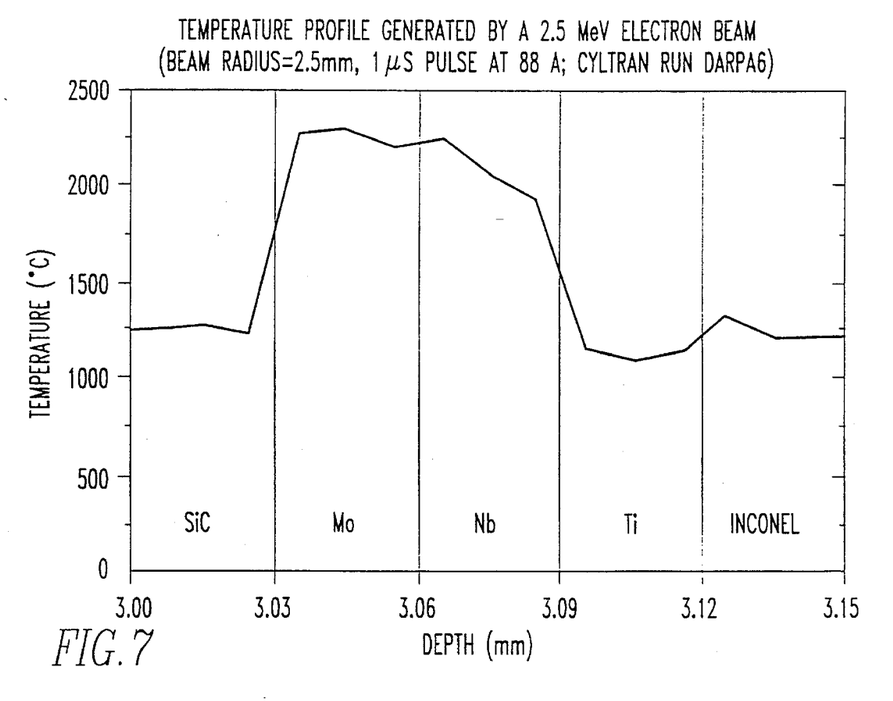
FIG. 7 is a graph showing a temperature profile for SiC/SiC-superalloy joining with a 2.5 MeV electron beam.

A preferred embodiment of a Pulsed Electron Beam (PEB) joining system is shown in FIG. 2. It consists of a vacuum chamber 20, electron gun 22 and transport system such as magnets 24 (which provides focusing of the beam), and a system 26 for positioning and fixturing the specimens to be joined. The electron gun uses, for example, a cold cathode 30 which is composed of a graphite fiber bundle in order to avoid the rapid poisoning of the oxide-coated cathode of conventional electron guns by debris from the joining process. FIG. 3 illustrates the electron beam trajectory using focusing magnets to achieve a beam spot size down to approximately 1 mm. The fixturing system 26 can use any conventional clamping arrangement commonly in use, as long as it allows an opening for irradiation and applies appropriate pressure to ensure good contact and alignment of the material layers to be joined. To cover the full joint region, either the electron beam can be scanned using electromagnetic means or the sample can be moved mechanically. If it is not desirable to perform the joining in the vacuum chamber 20, the electron beam can be brought out to the atmosphere through a thin metal foil. In this case a conventional electron gun could be used.

Either similar or dissimilar materials of any type can be joined using this method, for example, metals, ceramics, polymers, glasses or composites. The materials can be Al$_2$O$_3$, ZrO$_2$, SiC, Si$_3$N$_4$, AlN, TiB$_2$, TiC TiN, MoSi$_2$, PZT, PLZT. Examples of ceramic composites which can be joined are SiC/SiC, SiC/Al$_2$O$_3$, Si$_3$N$_4$/SiC, C/SiC, and C—C. Intermetallic materials, such as iron aluminide, nickel aluminide and titanium aluminide, can be used. Further, polymer or polymer matrix composites could be used. The parameters which determine the joining temperature profile are the electron energy, current density, pulse length, and repetition rate of the electron beam and the density, thicknesses, specific heat and thermal skin depth of the materials to be joined and any interlayer materials used. The proper choice of these parameters is critical to achieve joining. In particular, the pulse length must be long enough to minimize shock wave effects, but short enough to prevent thermal energy leakage from the interfacial region. For the materials of interest, this range is approximately 100 nsec ($10^{-7}$ seconds) to 100 μsec ($10^{-4}$ seconds). The beam current density is also a critical parameter. Too high a current density will cause damage rather than joining. Too low a current density will not provide heating to joining temperature with a single pulse. The desired range of current density is approximately a few to a few hundred A/cm$^2$. However, this depends also on the properties and thicknesses of the irradiated materials, as well as the electron energy.

Three specific examples of the preferred embodiment are described below. The first two are ceramic-metal joints. The third illustrates the variation of temperature profile possible by varying the specific heat of interlayer materials. Many other embodiments will be obvious to those skilled in the art, including: brazing of ceramics to ceramics with either metallic or glassy interlayers; rapid fusion bonding of metals; joining of polymers to metals, ceramics, glasses or composites; and composite-composite joining. In all of these examples, the necessary temperature profile for joining the irradiated material is achieved with a single PEB pulse.

EXAMPLE 1

SiC/SiC Ceramic Composite to Superalloy

This type of joint is required to allow the introduction of ceramic composite materials in advanced turbine engines, where their light weight and corrosion resistance at high temperature will provide increased turbine thrust, higher efficiency, longer lifetime and less environmental damage, as compared to metallic components. For a SiC/SiC composite-superalloy joint, Material 1 in FIG. 1 is the SiC/SiC composite and Material 2 is the superalloy. The PEB will be directed through the composite, with the electron energy chosen for the peak of the deposition at the interlayer 16. For a composite thickness of 0.05 –3 mm, this translates to an electron energy in the range of 250 keV-3 MeV. The interlayer materials chosen for this joint are a set of metal foils with graded CTE to minimize the CTE mismatch between the SiC/SiC ($3\times10^{-6}$/°C.) and the superalloy ($12\times10^{-6}$/°C.). The sequence of foils for this particular joint is Mo ($4.9\times10^{-6}$/°C.):Nb ($7.3\times10^{-6}$/°C.):Ti ($8.4\times10^{-6}$/°C.). This sequence of metal foils provides for the highest density and lowest specific heat material in the interlayer to be at the ceramic interface, and the lowest density and highest specific heat interlayer material to be at the metallic interface, which will cause the electron energy deposition and temperature level to be greatest at the ceramic interface. The choice of Mo at the SiC—SiC interface was made because Mo$_2$C, which is formed by reaction between SiC and Mo, is known to wet SiC, and in the presence of a small amount of excess carbon will melt to the liquid phase at the Mo—Mo$_2$C eutectic temperature of 2200° C., and then form a strong eutectic lamellar structure upon cooling. The melting temperatures of the metal foils are 2610° C. for Mo, 2468° C for Nb, and 1668° C. for Ti, whereas the superalloy (e.g., Inconel from International Nickel Corporation or Mar-M 247 from Martin Marietta) melts in the 1400° C. range and should not be heated to beyond its service temperature of about 800–1000° C. in order to retain its properties.

FIGS. 4–7 show computed temperature profiles for this SiC/SiC-superalloy joint. The computations were performed using a Monte Carlo computer simulation code that calculates the electron energy deposition as a function of distance into the materials using the actual densities and thicknesses of each material layer. The electron energy deposition profile was converted to a temperature profile using the known densities and specific heats of the materials. The radius of the electron beam was assumed to be 2–2.5 mm, and the pulse length was 1 μsec (1×10$^{-6}$ sec). The electron beam energy and current were varied in order to demonstrate the ability to penetrate and join different thicknesses of composite material. As demonstrated by the figures, for SiC/SiC thicknesses from 0.05–3 mm, temperature profiles can be obtained that exceed the Mo—Mo$_2$C eutectic temperature at the SiC/SiC interface without heating the superalloy above its service temperature. This demonstrates the unique ability of the PEB joining method to selectively heat the interface to joining temperature without degrading the bulk materials.

The selection of beam pulse length involves a tradeoff between thermally-induced pressure wave generation by short pulses and thermal diffusion from the interlayer region for long pulses. In order to keep the beam-induced pressure wave amplitude low, a beam pulse length was chosen that is long enough for the pressure wave to travel over a distance large compared to the source size. The peak propagating stress amplitude can be estimated from the following equation:

$$T_m = \frac{\rho \Gamma E}{4} \left[ \frac{R}{Ct_p} \right]$$

where ρ is the density of the irradiated material, E is the electron energy, R is the range of the electron beam, $t_p$ is the beam pulse length, c is the speed of sound in the material, and Γ is the Gruneisen coefficient of the irradiated material. For a thin specimen, the range R is replaced by the thickness of the material. Estimates using parameters appropriate to the materials shown in FIGS. 4–7 show that for a 1 μsec long pulse and electron energy of up to 3 MeV, pressure wave effects will not impede bonding. This pulse length, which is in the optimum range for ceramic-metal bonding, is atypical of most existing electron beam-producing accelerators that were assembled for defense applications. Such accelerators typically produce much shorter pulse lengths, e.g., 10–50 nsec, which would create too large a pressure wave amplitude for joining.

In order to maintain the temperature profile resulting from electron beam irradiation, thermal diffusion must be minimized. The temperature profile can be maintained by forcing the thermal skin depth of the irradiated materials to be small compared to the width of the temperature profile. The thermal skin depth, d, is given by the following expression:

$$d \approx \sqrt{\frac{2 K t_p}{C_p \rho}}$$

where K is the thermal conductivity and $c_p$ is the heat capacity of the irradiated material. For the materials used in this example, the thermal skin depth (in mm) is calculated to be: 2.5(SiC/SiC); 4.2(Ti); 6.7(Nb); 7(Inconel); and 10(Mo). From the thicknesses of the layers in FIGS. 4–7, it is seen that the temperature profile is maintained.

Figure 8:
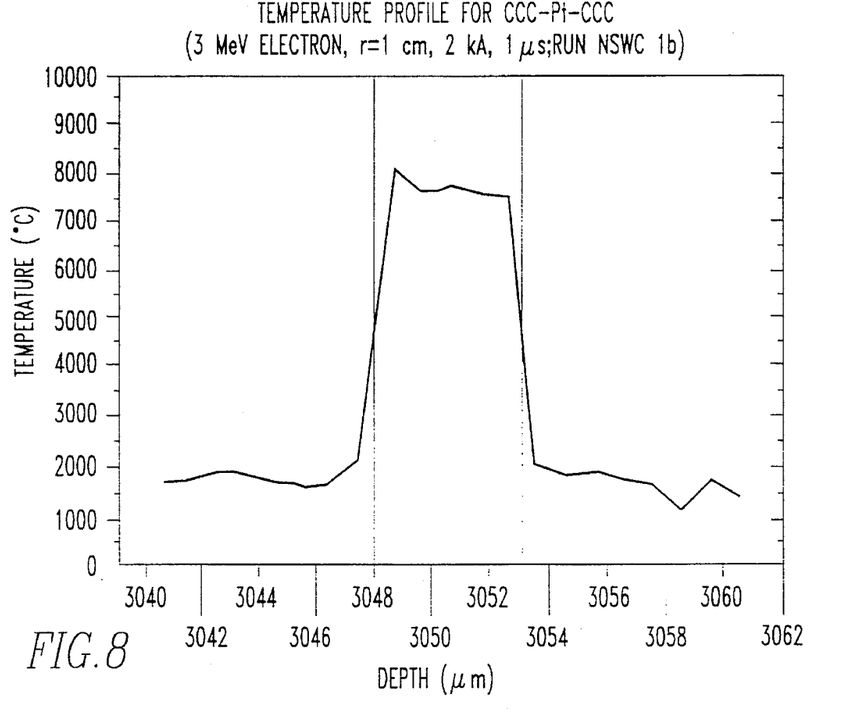
FIG. 8 is a graph showing a monte carlo simulation of C—C composite—platinum—C—C composite temperature profile.

In order to obtain the desired maximum temperature at the joint interlayer (slightly greater than 2200° C.), a beam current density in the range of 50–500 A/cm$^2$ was used. This choice of beam current density was dictated by tradeoffs based upon the properties of the irradiated materials such as the density, specific heat and thermal conductivity, as well as the electron energy being used. This is illustrated by the results of a recent unsuccessful attempt to accomplish C—C composite joining using a high energy electron beam (C. D. Ludlin et al, AWS Conference and Workshop Proceedings on High Energy Electron Beam Welding and Materials Processing, p. 123, previously referenced). Ludlin et al used a beam current density of 100 A/cm$^2$ with an electron energy of 3 MeV and a thickness of material to penetrate of a few mm. These parameters are similar to those shown in FIG. 7 for the SiC/SiC composite to superalloy case. However, the C—C composite material has lower density and greater specific heat than the SiC/SiC composite, and the metal interlayer in the Ludlin et al case is sandwiched in-between two pieces of composite. Consequently, a significantly lower value of beam current is required to prevent melting and evaporation of the metal interlayer. This is illustrated in FIG. 8, which is a Monte Carlo simulation of the temperature profile produced by electron beam irradiation using the electron beam parameters and materials and joining configuration reported by Ludlin et al. The maximum temperature in the metal interlayer is much too high for joining and is in fact sufficient to vaporize the metal. In addition to reducing the beam current density, other parameters that could be varied to achieve the desired temperature for joining this combination of materials include increasing the thickness of the metal interlayer and reducing the electron energy.

EXAMPLE 2

Joining of Piezoelectric Materials to Shape Memory Alloys

Figure 9A:
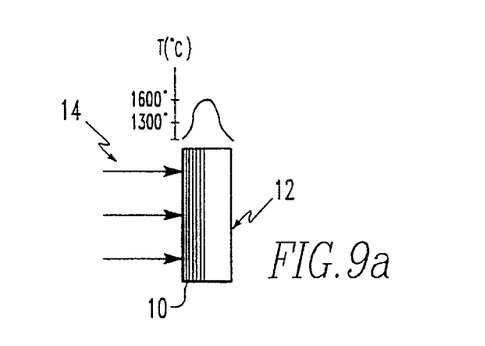
FIGS. 9a and 9b are schematic representations showing pulsed electron beam irradiation schemes for joining of piezoelectric ceramic to shape memory alloy.
Figure 9B:
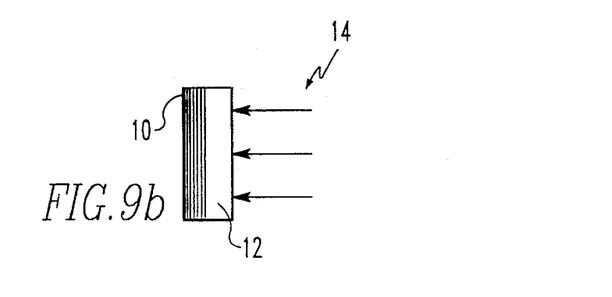

Shape memory alloys are a class of metal alloys that have the ability to return to a predetermined shape upon heating. Piezoelectric materials are ceramics that can convert electrical impulses into mechanical strain. Bonded together, these dissimilar materials can form the basis for a new class of "smart materials" with the capability to respond to a wide variety of mechanical and electrical stimuli. FIGS. 9a and 9b show the joint design for PEB joining of a shape memory alloy to a piezoelectric ceramic. FIG. 9a shows the joint being irradiated from the shape memory alloy side 10. FIG. 9b shows the joint being irradiated from the piezoelectric ceramic side 12.

The desired temperature profile for piezoelectric to shape memory alloy joining depends upon the specific choice of materials. The principal factor influencing this choice is the CTE of the materials, because a large thermal expansion mismatch will almost certainly cause debonding and/or cracking of the piezoelectric upon cooling from the bonding temperature. In order to minimize the CTE mismatch, a variation of lead titanate, $(Pb_{0.93}La_{0.07})(Zr_{.0.65}Ti_{0.35})O_3$ (PLZT), was chosen as the piezoelectric material and Ni—Ti as the shape memory alloy for this example. The CTE of PLZT is in the range of $4-8\times10_{-6}/°C.$, while Ni—Ti has a CTE of 10–14 in the same units. This choice of materials requires a temperature of about 1600° C. at the interface to melt and fuse the PLZT. The melting temperature of the Ni—Ti is 1300° C., so the desired temperature profile is one that decreases rapidly in the shape memory alloy. A thin layer of a Ti alloy may be introduced between the materials to be bonded in order to provide a graded CTE and compositional interlayer from the PLZT (which is a Ti oxide) to the Ni—Ti shape memory alloy. This Ti alloy interlayer 16 can also serve as a thermal buffer layer and provide a ternary alloy composition leading to a eutectic bond upon cooling, as in Example 1.

Figure 10:
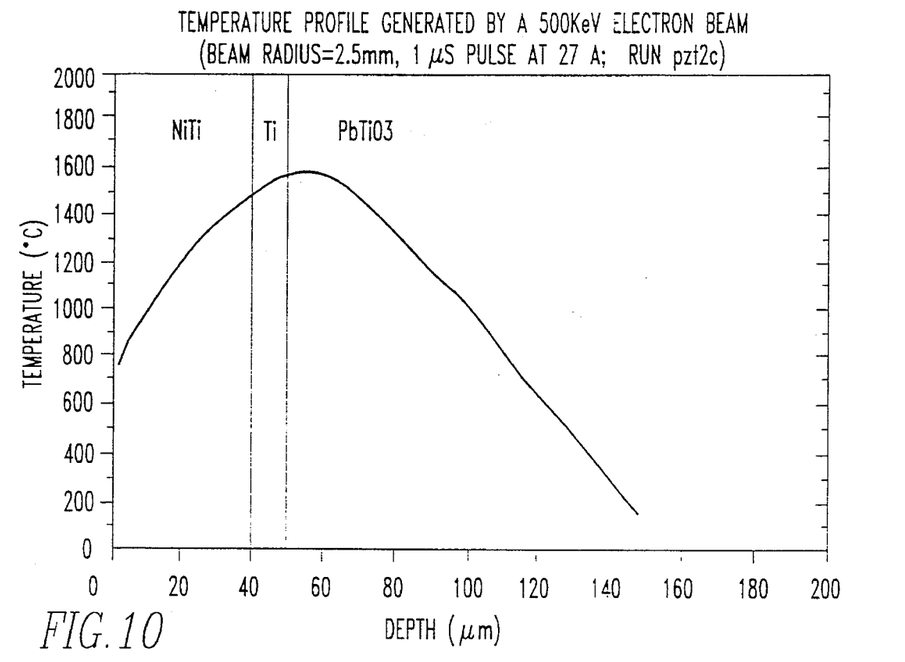
FIG. 10 is a graph showing a temperature profile for piezoelectric ceramic-shape memory alloy joining.
Figure 11:
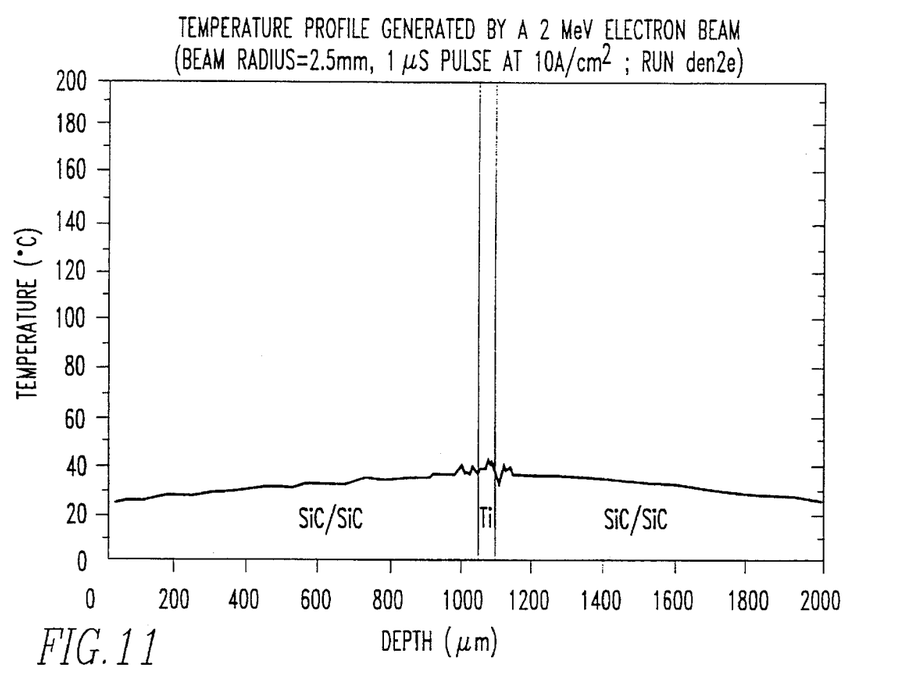
FIG. 11 is a graph showing a temperature profile for SiC/SiC with Ti interlayer.
Figure 12:
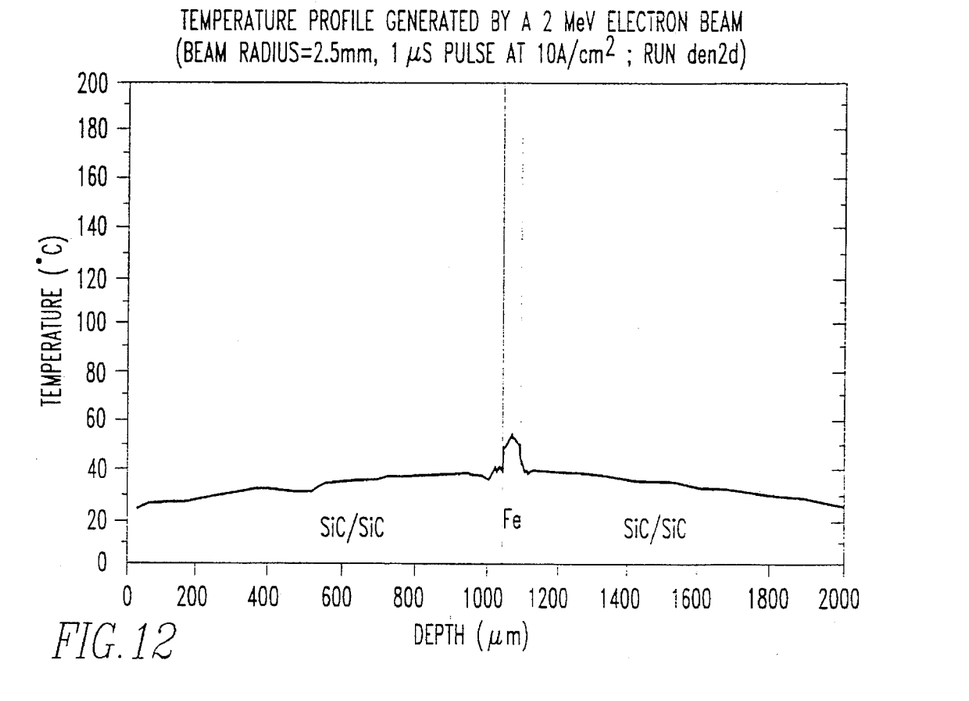
FIG. 12 is a graph showing temperature profile for SiC/SiC with Fe interlayer.
Figure 13:
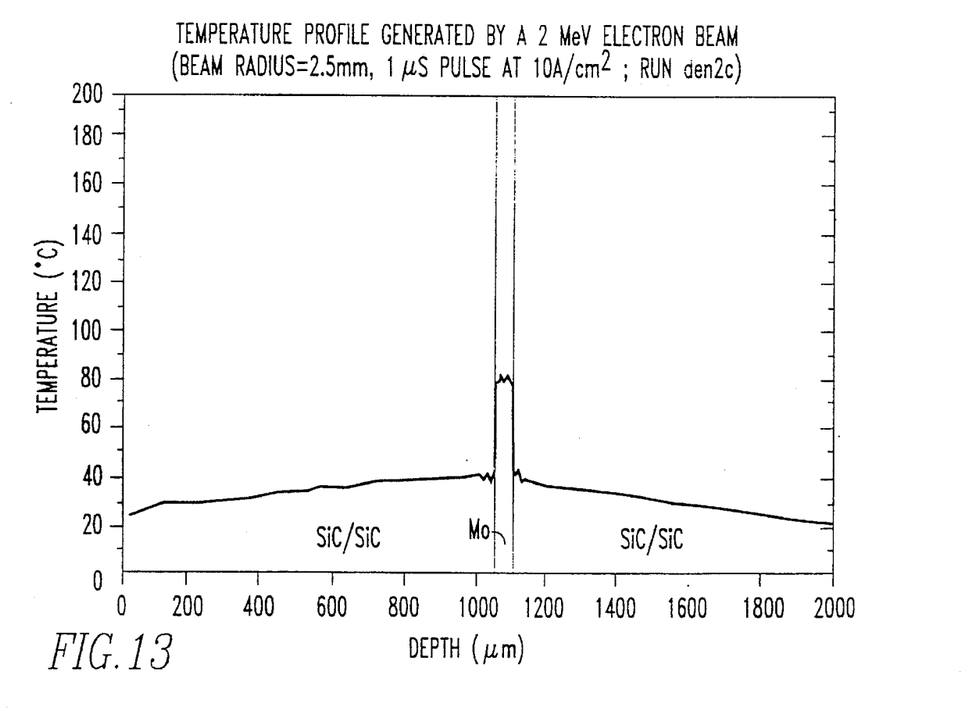
FIG. 13 is a graph showing temperature profile for SiC/SiC with Mo interlayer.
Figure 14:
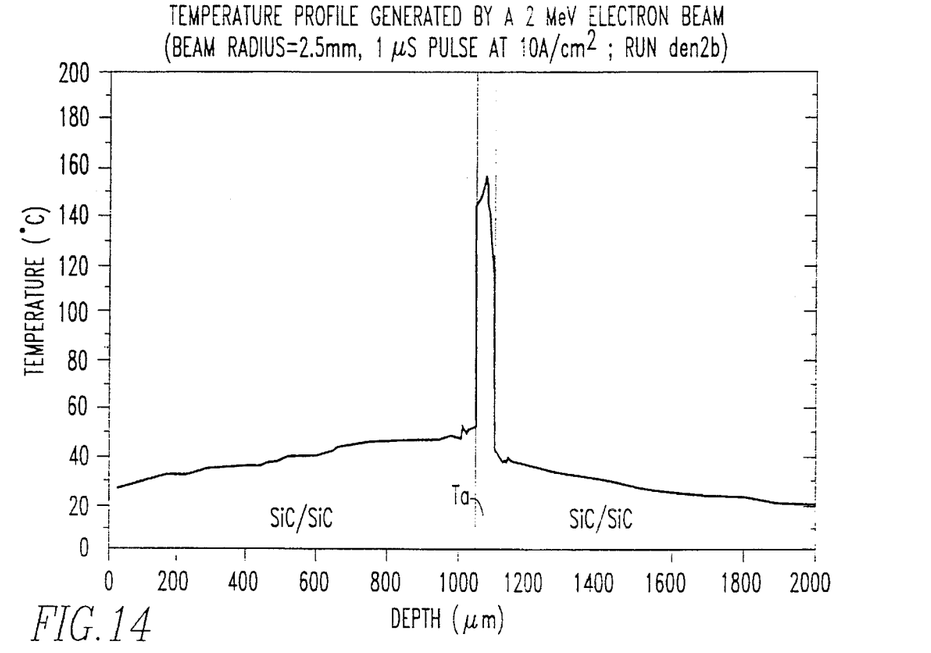
FIG. 14 is a graph showing temperature profile for SiC/SiC with Ta interlayer.
Figure 15:
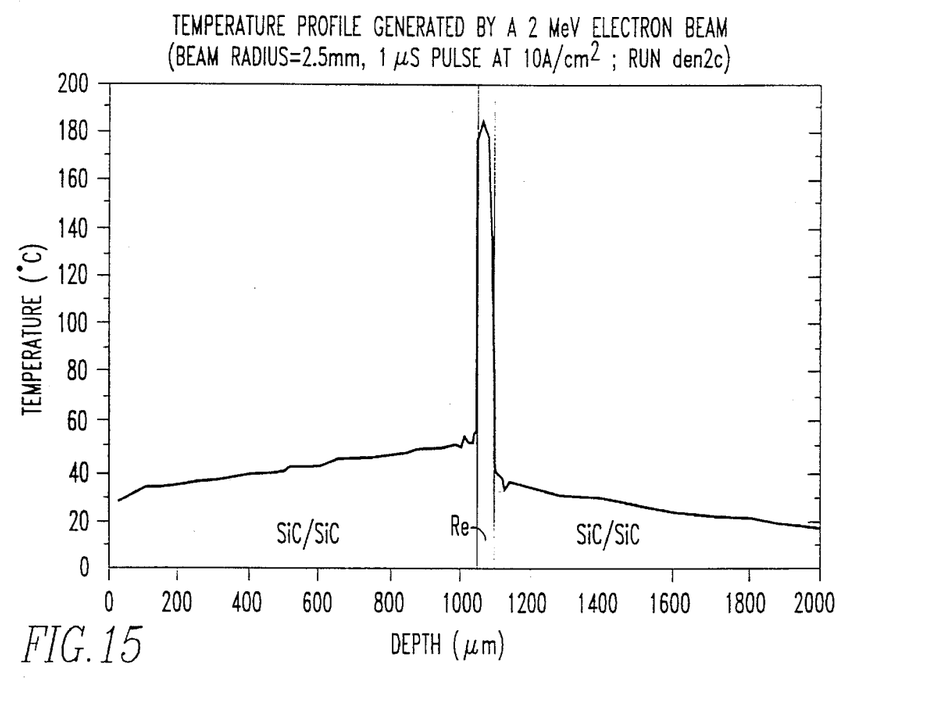
FIG. 15 is a graph showing temperature profile for SiC/SiC with Re interlayer.

FIG. 10 shows the result of a Monte Carlo computer simulation of the temperature profile of a piezoelectric-shape memory alloy specimen irradiated by a PEB. In this example, the beam enters the specimen through the shape memory alloy 10, as in FIG. 9*a*. Similar temperature profiles are obtained with the beam entering through the piezoelectric material 12, as in FIG. 9*b*. The shape of the calculated temperature profile using the nominal parameters is consistent with the formation of a fusion bond between the PLZT and the Ni—Ti shape memory alloy.

EXAMPLE 3

Effect on Temperature Profile of Specific Heat of Interlayer Material

FIGS. 11–15 illustrate the effect on the temperature profile generated by PEB irradiation of varying the specific heat of the interlayer material. For the purposes of this illustration, a similar material joint between SiC/SiC specimens was used, and the interlayers 16 were thin metal foils. However, the principle demonstrated is applicable to any type of joint and interlayer materials 16. For the same values of the electron beam parameters and the same thickness of SiC/SiC, a sequence of metallic interlayers of identical thickness, but decreasing specific heat (in J/gm-°C.) was imposed, as follows: Ti (0.496); Fe (0.440); Mo (0,264); Ta (0.151); and Re (0.132). The temperature profiles, again computed using the Monte Carlo computer simulation code, show almost no variation in the temperature profile across the Ti joint interlayer, which has a specific heat closest to that of the SiC/SiC (0.62). The temperature profile shows a small peak for the Fe interlayer, and a more pronounced peak which grows as the specific heat of the interlayer material is decreased. This demonstrates that the PEB temperature profile can be caused to reach a peak of any desired height in the joint interlayer through selection of an interlayer material with appropriate specific heat. In this example, the same value of the electron beam current density (10 A/cm$^2$) was used for all interlayer materials to allow comparison of the temperature profiles. Any desired maximum temperature can be obtained through a linear scaling of beam current density, as was shown in the previous examples.

Although the invention has been described in detail in the foregoing embodiments for the purpose of illustration, it is to be understood that such detail is solely for that purpose and that variations can be made therein by those skilled in the art without departing from the spirit and scope of the invention except as it may be described by the following claims.

What is claimed is:

1. A method of joining two materials by single pulse electron radiation comprising the steps of:

disposing a first material layer adjacent to a second material layer such that an interface is disposed therebetween; and irradiating the interface with a pulsed electron beam with a pulse length in the range of 100 nsec ($10^{-7}$ sec) to 100 μsec ($10^4$ sec) and a beam current density in the range of 1–1000 amps per square centimeter such that the pulsed electron beam penetrates one of the materials and energy of the pulsed electron beam is selectively deposited in a spatial region and localized at the interface to produce a joint between the first and second material layers in a single pulse.

2. (Amended) A method as described in claim 1 wherein before the irradiating step, there is the step of determining a temperature profile across the interface depending on electron energy beam current density and pulse length of the pulsed electron beam so that the electron beam pulse length and current density can be selected that upon irradiation will provide the determined temperature profile.

3. A method as described in claim 2 wherein the pulsed electron beam pulse length is in the range of $10^{-7}$ seconds to $10^{-4}$ seconds.

4. A method as described in claim 2 wherein the electron energy of the pulsed electron beam is in the range of 100 keV to 10 MeV.

5. A method as described in claim 2 wherein the pulsed electron beam current density is in the range of 1–1000 A/cm$^2$.

6. A method as described in claim 5 wherein the irradiating step results in a temperature profile having a peak at the interface.

7. A method as described in claim 1 wherein before the irradiating step, there is the step of placing interlayer material in the interface, said irradiating step selectively depositing energy of the pulsed electron beam primarily into the interlayer material.

8. A method as described in claim 7 wherein there are a plurality of interlayer materials.

9. A method as described in claim 8 wherein the interlayer materials have a graded coefficient of thermal expansion.

10. A method as described in claim 9 wherein the interlayer materials form a eutectic bond with one of the materials to be joined.

11. A method as described in claim 10 wherein before the irradiating step, there is the step of calculating the temperature profile across the interface depending on the specific heat of the interlayer materials so that materials can be selected with specific heat that upon irradiation will provide the determined temperature profile.

12. A method as described in claim 1 wherein one of the first and second materials is a ceramic, a glass or a glass ceramic.

13. A method as described in claim 12 wherein one of the first and second materials is comprised of one or more from the following group: $Al_2O_3$, $ZrO_2$, SiC, $Si_3N_4$, AlN, $TiB_2$, TiC TiN, $MoSi_2$, PZT, PLZT.

14. A method as described in claim 1 in which one of the materials is a ceramic composite comprising one or more from the following group: SiC/SiC, SiC/ $Al_2O_3$, $Si_3N_4$/SiC, C/SiC, and C—C.

15. A method as described in claim 1 in which one of the first and second materials is a metal comprising one or more from the following group: iron, nickel or cobalt-based superalloys, stainless steel, aluminum alloys, titanium alloys, copper alloys, and copper-nickel alloys.

16. A method as described in claim 1 wherein one of the first and second materials is an intermetallic compound comprising one or more from the following group: iron aluminide, nickel aluminide and titanium aluminide.

17. A method as described in claim 1 in which one of the first and second materials is a polymer or polymer matrix composite.

18. A method as described in claim 1 in which the first material is a ceramic composite and the second material is a superalloy.

19. A method as described in claim 1 in which the first material is a piezoelectric ceramic and the second material is a shape memory alloy.

* * * * *